(12) United States Patent
Morton-Finger

(10) Patent No.: US 8,999,213 B2
(45) Date of Patent: Apr. 7, 2015

(54) PROCESS FOR MAKING ARTIFICIAL TURF FIBERS

(71) Applicant: Tarkett, Inc., Farnham (CA)

(72) Inventor: Juergen Morton-Finger, Weinheim (DE)

(73) Assignee: Tarkett, Inc., Farnham (CA)

(*) Notice: Subject to any disclaimer, the term of this patent is extended or adjusted under 35 U.S.C. 154(b) by 83 days.

(21) Appl. No.: 13/654,806

(22) Filed: Oct. 18, 2012

(65) Prior Publication Data

US 2013/0098531 A1 Apr. 25, 2013

Related U.S. Application Data

(60) Provisional application No. 61/549,443, filed on Oct. 20, 2011.

(51) Int. Cl.
*D02G 3/38* (2006.01)
*E01C 13/08* (2006.01)
*D01D 5/42* (2006.01)
*B29C 47/00* (2006.01)
*B29C 47/08* (2006.01)

(52) U.S. Cl.
CPC .............. *E01C 13/08* (2013.01); *D01D 5/423* (2013.01); *B29C 47/0014* (2013.01); *B29C 47/0021* (2013.01); *B29C 47/0898* (2013.01); *D01D 5/426* (2013.01)

(58) Field of Classification Search
CPC ............ D01D 5/42; D01D 5/423; D02G 3/38
USPC ........... 264/103, 145, 146, 147, 171.1, 210.1, 264/210.2, 211.12; 57/3, 6, 12, 210, 212, 57/362
See application file for complete search history.

(56) References Cited

U.S. PATENT DOCUMENTS

| 3,496,259 | A  | * | 2/1970  | Guenther ................. 264/147 X |
| 6,449,937 | B1 | * | 9/2002  | Galan I Llongueras ............ 57/6 |
| 7,939,144 | B2 |   | 5/2011  | Verleyen |
| 2005/0281963 | A1 |   | 12/2005 | Cook |
| 2006/0093783 | A1 | * | 5/2006  | De Clerck ....................... 428/92 |
| 2011/0250448 | A1 | * | 10/2011 | Jones et al. ............... 264/146 X |

FOREIGN PATENT DOCUMENTS

| EP | 0 417 832 | 8/1993 |
| EP | 0 996 781 | 10/2002 |
| EP | 1 739 233 | 1/2007 |
| GB | 1242346 A | * | 8/1971 |
| WO | 99/04074 | 1/1999 |
| WO | 2009/005375 A1 | 1/2009 |
| WO | 2010/128196 | 11/2010 |

OTHER PUBLICATIONS

PCT Search Report and Written Opinion for PCT/IB2012/002603 (dated Feb. 11, 2013).

* cited by examiner

*Primary Examiner* — Leo B Tentoni
(74) *Attorney, Agent, or Firm* — Winston & Strawn LLP

(57) ABSTRACT

A method of making a fiber for use in association with an artificial turf system, as well as an artificial turf system having such a fiber. The fiber is made by extruding a fiber, fibrillating the fiber, and storing the fiber, wherein the fiber is not cut longitudinally between the step of extruding the fiber and storing the fiber. After being extruded the fiber may be folded and wrapped with a wrapping yarn.

8 Claims, 4 Drawing Sheets

PROCESS FOR MAKING ARTIFICIAL TURF FIBERS

CROSS REFERENCE TO RELATED APPLICATIONS

This application claims priority to U.S. provisional application Ser. No. 61/549,443 filed on Oct. 20, 2011, the entirety of which is incorporated herein by reference.

FIELD OF THE INVENTION

The invention relates to fibers for use in association with an artificial turf system and more particularly to a process for making the fibers.

BACKGROUND OF THE INVENTION

Artificial turf systems (also known as synthetic grass fields) have become a popular alternative to a natural grass field. These artificial turf systems typically include fibers tufted through a backing material and a particulate infill disposed on top of the backing material and in between the fibers.

Generally, there are two types of fibers that are commonly used in such artificial turf systems: monofilament fibers; and, slit film fibers.

The monofilament fibers are comprised of a single strand of material. The material is extruded through a spinneret to create a single strand (or multiple individual strands out of a single spinneret). After cooling, the strand is stored on a bobbin until it is ready to be tufted into a backing material. Typically, multiple strands are tufted together to the backing material in a group of fibers commonly referred to as a "tuft."

The strand can have a variety of shapes and geometries including, flat, round, bat-wing, spined, or other known geometries. Since the monofilament fibers can be extruded in a variety of known geometries, it is believed by some that the monofilament fibers have a more natural look and increased structural integrity.

Inasmuch as the monofilament fibers are individually produced, attaching the tufts of individual monofilament fibers to a backing material can be complex—especially if compared with attaching a slit film fiber to a backing material.

Further, when using monofilament fibers, many manufacturers produce a finished product having a lower tuft bind strength than what those manufacturers may have obtained had they used slit film fibers.

These potential drawbacks may be a result of the adhesive coatings typically applied over the tufts on the underside of the backing material. This adhesive is used to secure/bind the tufted monofilament fibers in place. Since each tuft is comprised of a plurality of individual monofilament fibers, the coating material may have difficulty penetrating into the various interior spaces between some of the individual fibers. This can result in not all of the individual fibers actually being secured to the backing material, and thus, the resulting turf may have a lower tuft bind strength.

Unlike monofilament fibers, slit film fiber is typically extruded into a broad flat sheet which is cut into thinner strips and then fibrillated, and which then may be stored on a bobbin. The individual strips are tufted through the backing material. After the infill is installed, the strips are mechanically brushed so that the ends of the strips above the backing material are partially separated and, from the top of the artificial turf system, appear to be tufts of monofilament fibers.

In order to ensure that the slit film fibers are relatively durable and not abrasive, the extruded sheet must either be subjected to a biaxial stretching process or comprised of a high price linear low density polyethylene (LLDPE). Both of these options for producing acceptable slit film fibers are costly—which may add to the overall cost associated with the artificial turf system.

In sheet extrusion, the flow at the center of the sheet is much different compared to the flow at the outer area of the sheet. This creates a non-uniform product relative to strips made from the outer area of the sheet when compared to strips made from the center of the sheet.

In addition, because the slit film strands are cut into thinner strips (which are stored on a bobbin), the manufacturing process is longer and the equipment larger when compared with a process and equipment for making a monofilament fiber.

In addition, although they are cut into thinner strips (usually having a width between 5-12 mm, this width is often too large for needles on a tufting machine. This increases the risk that the tufting needles will break during the manufacturing process. Accordingly to accommodate the large widths of the fibers in the needles, the fibers have to be twisted. This transfers the rectangular shape of the fibers into a round shape that can be effectively passed through a tufting needle. However, this twisting causes additional stress on the fibers (which is not desirable). Further, it is an additional step in the manufacturing process that requires additional machinery. Thus, it increases the time and costs associated with manufacturing artificial turf systems.

While these fibers and the methods of making same are suitable for their intended purpose, there remains a need for a fiber and method of making same that combines the benefits of the monofilament fiber and the slit film fiber.

The present invention is directed to resolving the above concern/issues.

SUMMARY OF THE INVENTION

In one embodiment of the present invention, the present invention comprises a method for making a fiber. The method includes the step of extruding a fiber and subsequently rolling the fiber on one or more fibrillating rollers to perforate (or fibrillate) the fiber so that the free ends (which extend above the infill) may be split after installation. The fiber may then be stored on a bobbin without any cutting of the fiber into thinner strips.

It a preferred embodiment, a spinneret produces a fiber having a width of 11 mm and a thickness of 0.13 mm, and it is further preferred that the spinneret produces 12 strands of fiber simultaneously.

It is also preferred that after the free ends of the fiber are split (when installed in a backing material and infill is placed between the fibers), the separated strands have a width of between 1-2 mm. Notwithstanding the above, it will be readily understood to those having ordinary skill in the art, that other dimensions associated with the initial extruded fiber width, thickness, strand numbers and strand dimensions can be modified as desired for a particular application.

Such a fiber is believed to have a better consistent molecular alignment (compared to the fibrillated strips which are extruded into a large sheet) which will impart a better durability to the fiber. Specifically, the different properties of outer strips and middle strips based upon the different flow from extrusion will be avoided, and, in turn, will instead result in fibers having a more consistent and relatively uniform molecular alignment.

In addition, it is believed that the use of the extrusion imparts a low abrasiveness (or softness) to the fiber making it suitable for use without further processing.

Moreover, when the free ends of the fiber are separated, some of the separated free ends (i.e., the two at the edge of the fiber) will have a rounded edge, similar to monofilament fibers, which creates less risk of injury compared to the sharp edges of the conventionally made slit film fibers.

In addition, one of more embodiments of the present invention provides a method that folds the fiber along its longitudinal axis and wrapped by a yarn. The folding and wrapping may occur after the extrusion step, which would eliminate the need for extra steps and additional machinery used in the tufting process. Further, the folding and wrapping reduces the mechanical stresses (compared to the twisting).

Further, in addition to producing a fiber that has some of the benefits of both monofilament fiber and conventional slit film fiber, the disclosed method may increase manufacturing capabilities allowing for one line or apparatus to produce regular monofilament fibers, if desired, or the slit film fibers like monofilament fibers disclosed herein.

It is to be understood that the aspects and objects of the present invention described above may be combinable and that other advantages and aspects of the present invention will become apparent to those having ordinary skill in the art upon reading the following description of the drawing and the detailed description thereof.

BRIEF DESCRIPTION OF THE DRAWINGS

The present invention will become more fully apparent from the following description and appended claims, taken in conjunction with the accompanying drawings. Understanding that the accompanying drawings depict only a typical embodiment, and are, therefore, not to be considered to be limiting of the scope of the present disclosure, the embodiments will be described and explained with specificity and detail in reference to the accompanying drawings as provided below.

DETAILED DESCRIPTION OF THE DRAWINGS

Figure 1:
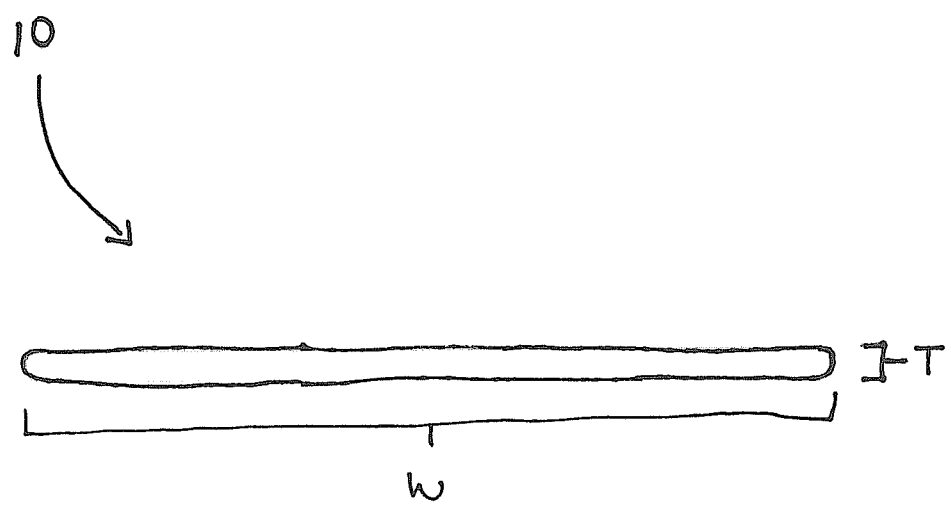
FIG. 1 is an elevated side view of a fiber according to an embodiment of the present invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference throughout this description to features, advantages, objects or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, any discussion of the features and advantages, and similar language, throughout this specification may, but does not necessarily, refer to the same embodiment.

Figure 2:
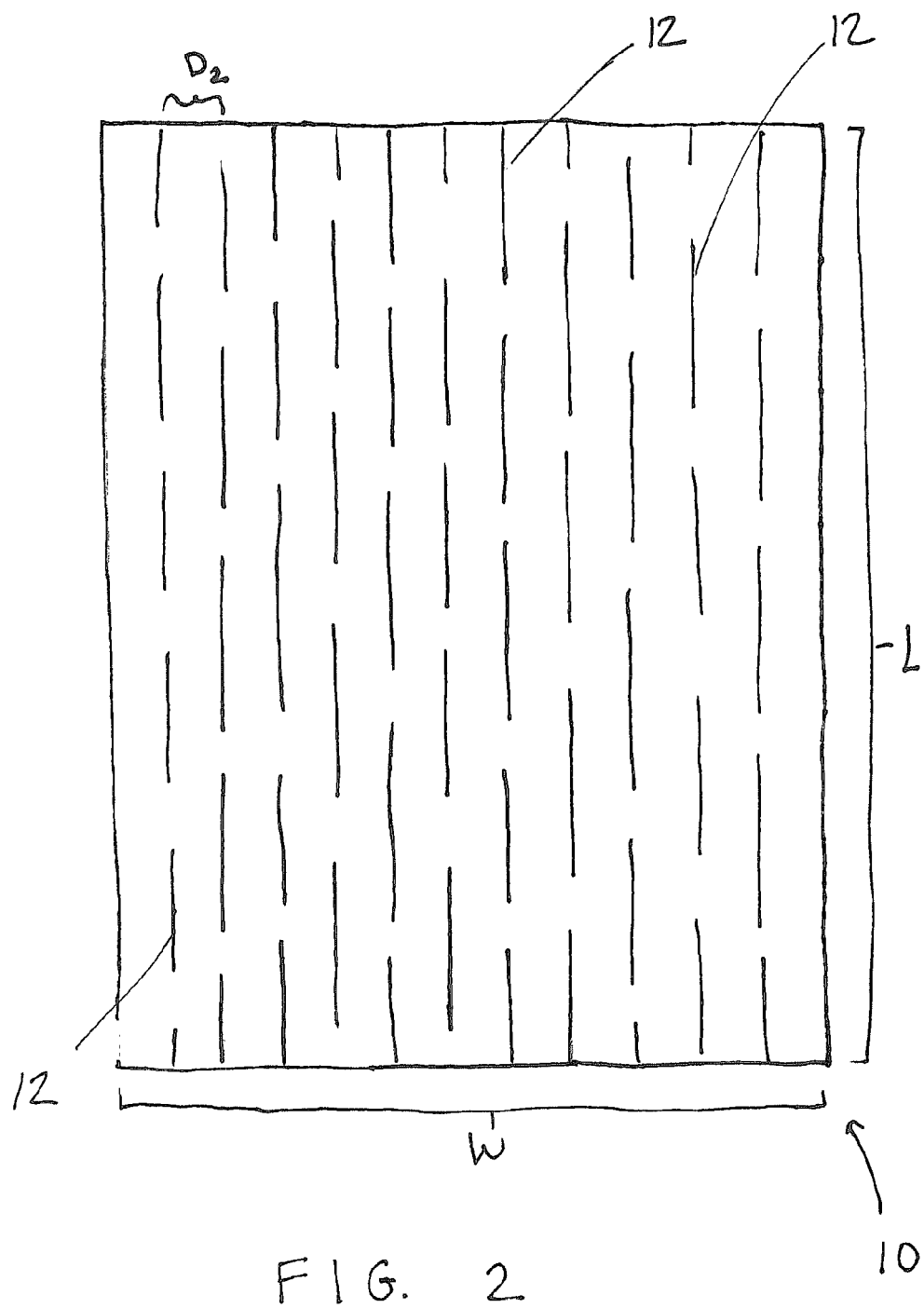
FIG. 2 is a top view of a fiber according an embodiment of the present invention.

As shown in FIGS. 1 and 2, fiber 10, according to an embodiment of the present invention, has a length L and a width W and a longitudinal axis extending along the length L. The length L is greater than the width W. In a preferred embodiment, the width is approximately 11 mm.

Fiber 10 also has a thickness T, which is preferably approximately 0.13 mm.

In order to make fiber 10 according to one or more embodiments of the present invention, a material is extruded through a spinneret. In one embodiment of the invention, the spinneret produces twelve (12) strands of fiber 10 simultaneously. The spinneret may produce fiber 10 having a width of 11 mm and a thickness of 0.13 mm. Of course, other dimensions could be used, and these disclosed measurements are merely preferred embodiments.

After being extruded, fiber 10 may be quenched, and then subsequently stretched. One of ordinary skill in the art will appreciate that some other processing steps may also be utilized.

After it has been extruded, fiber 10 is fibrillated with alternating fibrils 12. It is preferred that fiber 10 is fibrillated by rolling fiber 10 over a fibrillating roller.

Figure 3:
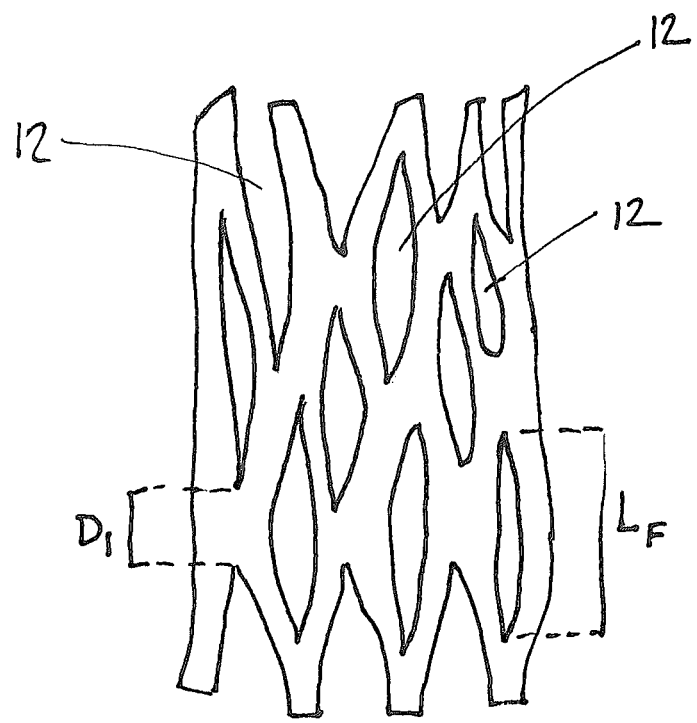
FIG. 3 is another top view of a fiber according an embodiment of the present invention.

As is shown in FIG. 3, fibril may have a length $L_F$ of approximately 20 mm long. Further, the distance $D_1$ between fibrils 12 adjacent along the longitudinal axis of fiber 10 is preferably approximately 5 mm.

Returning to FIG. 2, the distance $D_2$ between fibrils 12 adjacent along the width W of fiber 10 is preferably approximately 1-2 mm. Again, other dimensions are also contemplated by the present invention.

Figure 4:
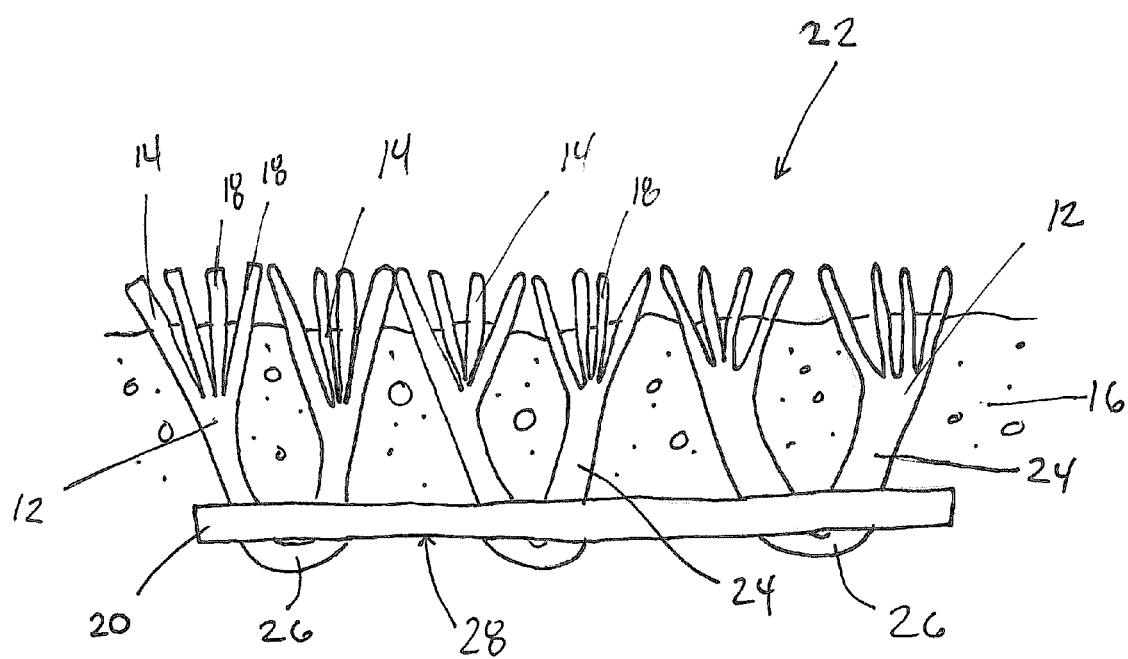
FIG. 4 is an elevated side cutaway view of an artificial turf system having a fiber according to an embodiment of the present invention.

As shown in FIG. 4, fiber 10 is fibrillated so that free ends 14 of fiber 10 (that extend above an infill 16) can be split into individual strands 18 after fiber 10 has been tufted through backing material 20.

Retuning to a method of making fiber 10, subsequent to being fibrillated, fiber 10 may be annealed and then dried. Alternatively, fiber 10 may be stretched, annealed and later fibrillated.

Moreover, after being extruded, fiber 10 may be folded and wrapped by a wrapping yarn.

Finally, fiber 10, preferably being folded and wrapped, may be wound about a bobbin and stored until needed. During this entire process, fiber 10 is not cut in a longitudinal direction into thinner strips. As used herein, "cut" is meant to include other manipulation to make fiber 10 into thinner strips. The production in such a manner eliminates or minimizes the differences created by flow during extrusion that occurs in the conventional method of manufacturing slit film fibers.

After being stored or inline with the production of fiber 10, fiber 10 may be tufted into a backing material 20 to make an artificial turf 22 product. See, FIG. 4. Subsequently, fiber 10 may be brushed mechanically, forcing free ends 14 of fiber 10 extending above infill 16 to be split along the fibrils 14 and separated into individual strands 18.

As shown in FIG. 4, at least a portion 24 of fiber 10 below the infill, and more particularly, a portion 26 on the underside 28 of the backing material 20, will have the same width W as fiber 10 that has just been extruded. In other words, a portion 24, 26 of fiber 10 maintains the width W of fiber 10 from production to use. This allows for an adhesive coating to be applied to portion 26 on underside 28 and backing material 20, and only a single strand will need to be secured thereto.

This is believed to result in greater tuft bind strength for fiber 10 than when compared to a tuft of multiple monofilament fibers. This is because at the point of application of the coating, fiber 10, is an individual fiber and will not require the coating material to impregnate multiple spaces between the individual fibers of a tuft.

Moreover, since fiber 10 is not cut lengthwise (into thinner strips), there is no need for additional equipment typically used to make thin strips, allowing for less expensive and physically smaller production equipment. Furthermore, since the present invention dispenses with the equipment necessary in the production of slit film fibers, the present invention allows for one production line to produce both monofilament fibers and fibrillated fibers according to the present invention.

Thus, a manufacturing company can produce both monofilament fibers and slit film (fibrillated) fibers from the same line. Therefore, the present invention can provide savings of space, money, and resources for the producers which could lead to lower cost for the consumers.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A method of making a slit film fiber comprising the steps of:
   extruding a fiber having a length and a width, the length being greater than the width and a longitudinal axis running along the length;
   forming a slit film fiber using the extruded fiber without cutting the extruded fiber along its entire longitudinal axis;
   then fibrillating the slit film fiber; and,
   then storing the slit film fiber.

2. The method of claim 1, wherein the width is approximately 11 mm.

3. The method of claim 1, wherein the step of extruding includes extruding through a spinneret that simultaneously produces 12 fibers.

4. The method of claim 1, wherein the step of fibrillating includes rolling the slit film fiber on a fibrillating roller.

5. The method of claim 4, wherein the space between adjacent fibrils along the longitudinal axis is approximately 5 mm and the fibrils have a length of approximately 20 mm.

6. A method of making a fiber comprising the steps of:
   extruding a fiber having a length and a width, the length being greater than the width and a longitudinal axis running along the length;
   fibrillating the fiber;
   folding the fiber along the longitudinal axis; and,
   wrapping the fiber in a wrapping yarn after the step of folding the fiber.

7. The method of claim 6 further comprising the step of:
   storing the fiber after the step of wrapping the fiber.

8. The method of claim 7 further comprising forming a slit film fiber using the extruded fiber without cutting the extruded fiber along the longitudinal axis.

* * * * *